United States Patent
Toth et al.

(10) Patent No.: US 7,107,066 B2
(45) Date of Patent: Sep. 12, 2006

(54) MULTICAST SUPPORT IN PACKET SWITCHED WIRELESS NETWORKS

(75) Inventors: Stefan Toth, Gothenburg (SE); Niklas Sven Lundin, Gothenburg (SE); Thomas R. Goransson, Molndal (SE); Tormod Hegdahl, Oslo (NO); Thorsten Lohmar, Aachen (DE); Frank Hundscheidt, Kerkrade (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 10/493,374

(22) PCT Filed: Oct. 3, 2002

(86) PCT No.: PCT/SE02/01799

§ 371 (c)(1),
(2), (4) Date: Nov. 15, 2004

(87) PCT Pub. No.: WO03/036872

PCT Pub. Date: May 1, 2003

(65) Prior Publication Data

US 2005/0053068 A1    Mar. 10, 2005

(51) Int. Cl.
*H04Q 7/20* (2006.01)
(52) U.S. Cl. ...................... 455/458; 370/390
(58) Field of Classification Search ................ 370/390; 455/458
See application file for complete search history.

(56) References Cited

U.S. PATENT DOCUMENTS

2005/0053068 A1 * 3/2005 Toth et al. ................. 370/390

* cited by examiner

*Primary Examiner*—William D. Cumming (57) ABSTRACT

A packet radio data network includes a gateway node (GGSN), at least one serving node (SGSN) coupled to the gateway node, a plurality of radio access nodes (RAN) coupled to the serving node (SGSN), the packet radio network transporting packet data from an external packet data network. The external packet data network includes, an Internet Service Provider (ISP), to mobile stations (MS) wirelessly attached to radio access nodes (RAN). A mobile station (MS) issues a membership report message requesting content of a specific multicast group, whereupon the gateway node (GGSN) issues a multicast context activation message to the serving node (SGSN). The serving node (SGSN) informs the radio access network (RAN) that the mobile station is joining the respective multicast group and sends a multicast activation response to the gateway node (GGSN).

7 Claims, 5 Drawing Sheets

——— One or more events
——— Single event

Fig. 4 - GGSN

MS Mobile Station
MC MultiCast

Fig. 5 - SGSN

MULTICAST SUPPORT IN PACKET SWITCHED WIRELESS NETWORKS

FIELD OF THE INVENTION

The present invention relates to multicast services for mobile networks. The present invention also relates to system components in mobile networks rendering such multicast services possible. More specifically the invention relates to multicasting in a GPRS network.

BACKGROUND OF THE INVENTION

As is known, unicast is a point-to-point distribution, whereby one stream of data exists per recipient on every link connecting a given recipient and the source.

Multicasting is a service that permits a source to send a message to a plurality of specific recipients. The notion multicasting ideally involves that only one copy of the message will pass over any link in a network and copies of the message will be made only where paths diverge. From a network perspective, multicasting dramatically reduces overall bandwidth consumption, since data is replicated in the network at appropriate points.

Receivers join a particular multicast session group by informing a corresponding multicast router whereby traffic is delivered to all members of that group by the network infrastructure. The transmission can be performed either from one user to many users, the so-called one-to-many multicast or many users send information to many receivers, the so-called many-to-many transmission.

For typical local area networks, LAN, utilising CSMA (Carrier Sense Multiplex Access) where nodes share a common communication medium, multicasting is easy to support. A specially addressed packet can be read off the communication medium by multiple hosts. Ethernet, for instance, supports uni-cast addresses, multicasting addresses and the network broadcast address.

Extending multicasting capabilities to inter-networks however led to the introduction of a router at the edge of a network in order to figure out dynamically how to forward the datagram, whereby a datagram denotes a data packet, which is established on the IP layer. The way of forwarding is deducted from the address included in the header of the datagram and from the routing table, which is administrated by the router.

With Internet Protocol IP multicast, receivers do not need to know who or where the senders are and senders do not need to know who the receivers are. Neither senders nor receivers need to care about the network topology as the network optimises delivery. The distribution of information via IP multicast is performed on the base of a hierarchical connection of the hosts, like for example a tree. Several algorithms have been proposed for building multicast distribution trees, like for example spanning trees, shared-trees, source-based trees, core-based trees. The descriptions of the corresponding algorithms can be found in "IP telephony: Packet-based multimedia communications systems" O. Hersent, D. Gurle, D. Petit, Addison-Wesley, Harlow, 2000. After the establishment of the distribution tree, the distribution of the information is done by the IP multicast routing protocols.

A specific IP multicast address denotes that a given datagram belongs to a multicast group rather than the addresses of individual recipients, as is the case with normal IP addresses. There are various possibilities of assigning multicast addresses to multicast groups. The task of a given multicast router is to encode the destination addresses and to route multicast datagrams according to information in its routing table.

For IP multicast, the membership of a multicast session group may be dynamic, that is, hosts may join and leave groups at any time. Hence, multicast routers need to update information on which other hosts and routers are present members of a given multicast group.

The Internet Group Management Protocol, IGMP, is a protocol that allows inter-domain routing of IP multicast data. Multicast routers use IGMP to learn which multicast groups have members on each of their attached physical networks. IGMP allows group termination to be quickly reported to the routing protocol, which is important for high-bandwidth multicast groups and sub-nets with highly volatile group membership.

According to IGMP, multicast routers periodically send a General Query to the all systems multicast group (224.0.0.1) (address) in order to determine if other multicast routers are present on the segment. A mechanism secures that only one multicast router adopts the state of Querying multicast router on a given segment. The querying router issues Group Specific Queries. In response, hosts send a Membership Report, informing whether the host is a member of the particular multicast group to the Querying router. When a router on the other hand receives a Report, it adds the group being reported to the list of multicast group memberships on the network on which it received the Report and sets a timer for membership. When a host joins a multicast group, it immediately transmits an unsolicited membership report. IGMP has been specified in Network Working Group RFC 2236.

Multicast Listener Discovery, MLD, is an alternative protocol to IGMP that allows the use of IPv6(Internet Protocol version 6). In MLD, a Multicast Listener Report message corresponds to the Membership Report of IGMP. Furthermore according to MLD, the message Multicast Listener Done, corresponds to a Membership Report. MLD is specified in Network Working Group RFC 2710.

Currently there is activity within the 3'rd generation partnership project, 3GPP, regarding the introduction and support of multicast services in packet data mobile systems.

According to known GPRS and UMTS networks, the mobile terminated down-link traffic is routed using identities which are designed to only handle point to point traffic.

As is known in the art, in order to perform unicast transport, a data structure denoted mobility management (MM) context exists in the mobile station and the SGSN. Moreover, a Packet data protocol (PDP), context, which e.g. comprises an IP address for allowing the mobile station to participate in an IP session with an Internet service provider exist at the mobile station, the SGSN and the GGSN.

The technical background about GPRS in GSM and UMTS is covered in the following:

3GPP TS 03.60V7.5.0(2001-01) 3rd Generation Partnership Project;

Technical Specification Group Services and System Aspects, Digital cellular Telecommunications System (Phase 2+), General Packet Radio Service (GPRS), Service Description, Stage 2(Release 1998).

3GPP TS 23.060V3.6.0(2001-01)
3rd Generation Partnership Project;
Technical Specification Group Services and System Aspects, General Packet Radio Service (GPRS),
Service Description, Stage 2(Release 1999).

SUMMARY OF THE INVENTION

The present invention achieves a more efficient multicast transmission in General Packet Radio Networks, more specifically those portions of the GPRS network according to 3GPP specifications that are denoted the Gn, Gp and the Iu-PS interface.

It is a first object of the invention to make it possible to introduce multicast services in mobile networks, such that resources are used efficiently. That is, transmitting information to a large group of receivers simultaneously while utilising a minimum of bandwidth.

It is another object to introduce a gateway node for obtaining multicast messaging in a packet radio data network.

It is another object to introduce a serving node for obtaining multicasting in a packet radio data network.

It is another object to set forth a mobile station establishing a multicast service in a packet radio data network.

Further advantages will appear from the following detailed description and the drawings of the invention.

DESCRIPTION OF PREFERRED EMBODIMENTS OF THE INVENTION

The present invention allows several users to listen to multicast transmissions in a wireless network and more specifically a GPRS network. This concept comprises an application level multicast session with the following properties:

The transmission is simplex, unidirectional, sent from one source to many end users, located at one or many geographical sites. There is one source and many end users. The user must register to the service to get the information needed (e.g. decoding, ciphering key etc.) for the terminal to listen to the transmission via a data structure, denoted multicast context, which several users can share. The multicast context relates to various parameters or data for a mobile station involved in a given session and comprises data about e.g. multicast group address, APN used, QoS.

The multicast context is a data structure that—unlike the MM context and PDP context—is not associated with a specific mobile station but with a specific multicast group. The multicast context is created in a given node when there is at least one member for the multicast group in the area served by the node.

The multicast context contains a list of the current members of the multicast group. The list points to the PDP context of each member. From the PDP context of the members, the current location of the members can be found.

From the multicast context, the SGSN and the GGSN derives routing tables, which enable the desired forwarding and possible replication of multicast data packets to be performed. Thereby, multiple mobile stations can receive the multicast context from the same stream.

Whenever multicast group members are added or removed or change locations, it is checked whether routing table entries should be added or removed.

The user may be notified of the presence of a certain multicast transmission, either by an active search for available services in a certain area, e.g. via a web page, or by getting information about the service via e.g. SMS or a push service.

Dynamic Multicast Tree

Figure 1:
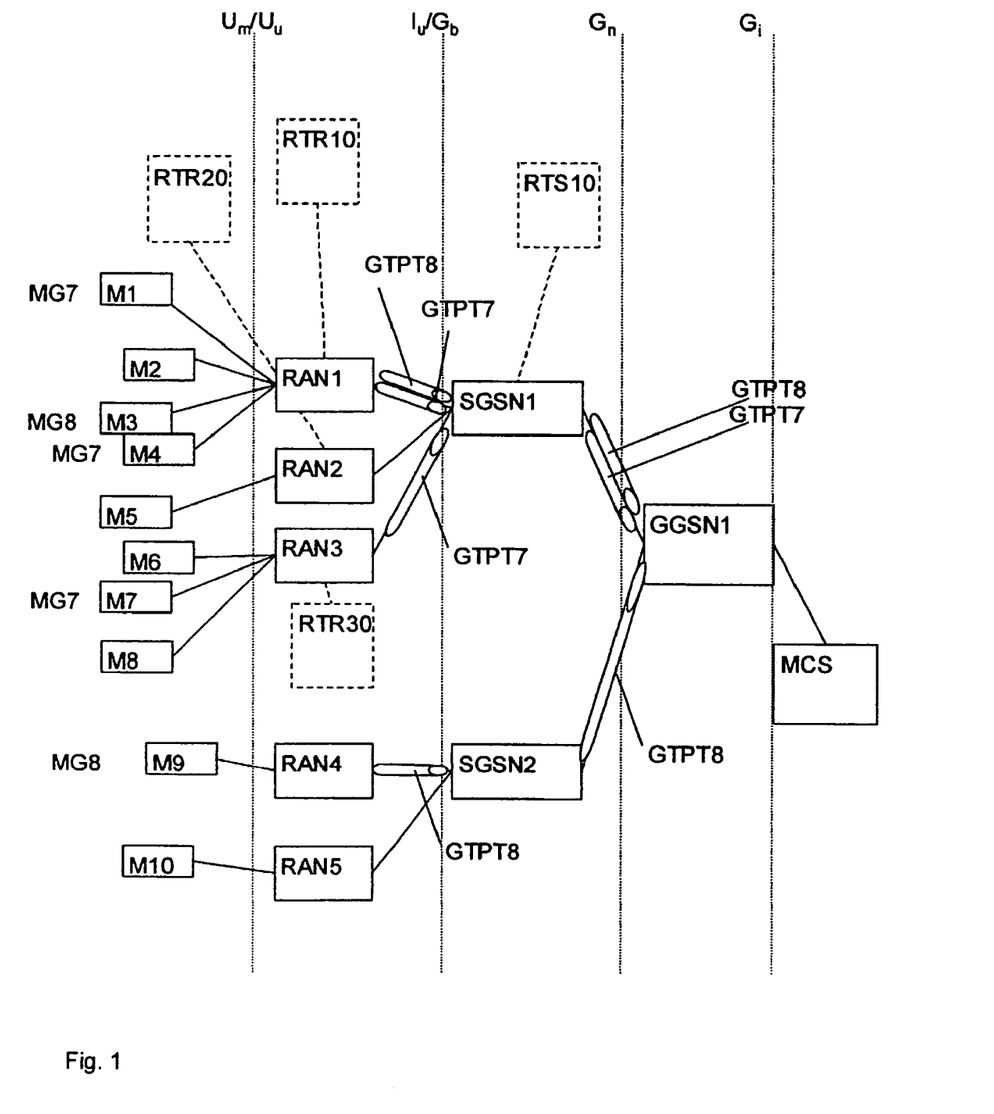
FIG. 1 shows multicast packet flows in an exemplary GPRS communication network according to a first embodiment of the invention.

In FIG. 1, an exemplary diagram relating to a GPRS network has been shown whereby the multicasting according to a first embodiment of the invention has been shown. In the given example a number of mobile stations M1–M10 are wirelessly connected to a number of base stations, also denoted radio access nodes (RAN1–RAN5). The RAN's are coupled to respective Serving GPRS Support Nodes (SGSN1, SGSN2), which then again are coupled to a Gateway GPRS Support Node (GGSN). A multicast source (MCS) is coupled to the GGSN and delivers for instance various multicast services such as streaming video and audio. An Internet Service Provider may accommodate the multicast source but the multicast source may also reside with the Gateway GPRS Support Node.

Packet streams are routed in the GGSN, SGSN1 and SGSN2 and RAN1–RAN5, by means of routing tables. An excerpt of routing tables has been shown in the present example, namely routing table RTR10 relating to RAN1, RTR20 relating to RAN2, RTR30 relating to RAN3 and RTS10 relating to SGSN1.

In the present example, the mobile stations M1, M4 and M7 wishes to receive multicast services of a multicast group MG7. Moreover, mobile stations M3 and M9 wishes to receive multicast services of a multicast group MG8.

It should be noted that in a real system, a higher number of mobile stations would typically be present. Moreover, many more services would be demanded and more QoS classes would be provided, either as individual multicast groups or by means of quality layering. However, for illustrative purposes the above simple example has been chosen.

According to a first embodiment of the invention, the GPRS tunnel protocol (GTP) renders the multicast connectivity possible. A GTP tunnel is a two-way, point to point path. By encapsulating a packet or a stream of IP packets with a tunnel specific header, data is tunnelled to a tunnel endpoint. In the following, the term multicast tunnel will be used for referring to a GTP tunnel that is adapted to carry an IP stream of multicast content, that is, content which potentially can or will be received by a plurality of end points.

According to the exemplary FIG. 1, a set of first multicast GTP tunnels, denoted GTPT7, is set up between GGSN1 and SGSN1 and between SGSN1 and RAN1 as well as between SGSN1 and RAN3. The GTP tunnels correspond to an encapsulation of the data stream with appropriate headers.

The multicast tunnel GTP7 carries the IP packet stream relating to multicast group 7, MG7, from GGSN1 to SGSN1, from where it is cast to RAN1 and RAN3, respectively. For this purpose, the data stream is encapsulated with a header comprising the addresses of SGSN1, and subsequently new headers corresponding to RAN1 and RAN3 are added.

In analogy with the above, tunnel GTPT8 carrying stream IPSTR8 is transmitted to mobile stations M3 and M9 being members of multicast group MG8. Tunnel GTPT8 carrying IP Stream IPSTR8 is replicated in GGSN1 and transmitted to SGSN1 and SGSN2. Tunnels Routing tables RTR10, RTR20 and RTR30, secure that the various streams are provided to only those respective mobile stations which subscribe to the given multicast group.

It is noted that the GGSN and SGSN does not examine the content of the tunnels (packets), but that the SGSN just redirects the tunnels according to the routing table in the respective entity.

Hence, a PDP type multipoint service, which enables the above multicasting traffic, has been set forth.

Static Multicast Tree

Figure 2:
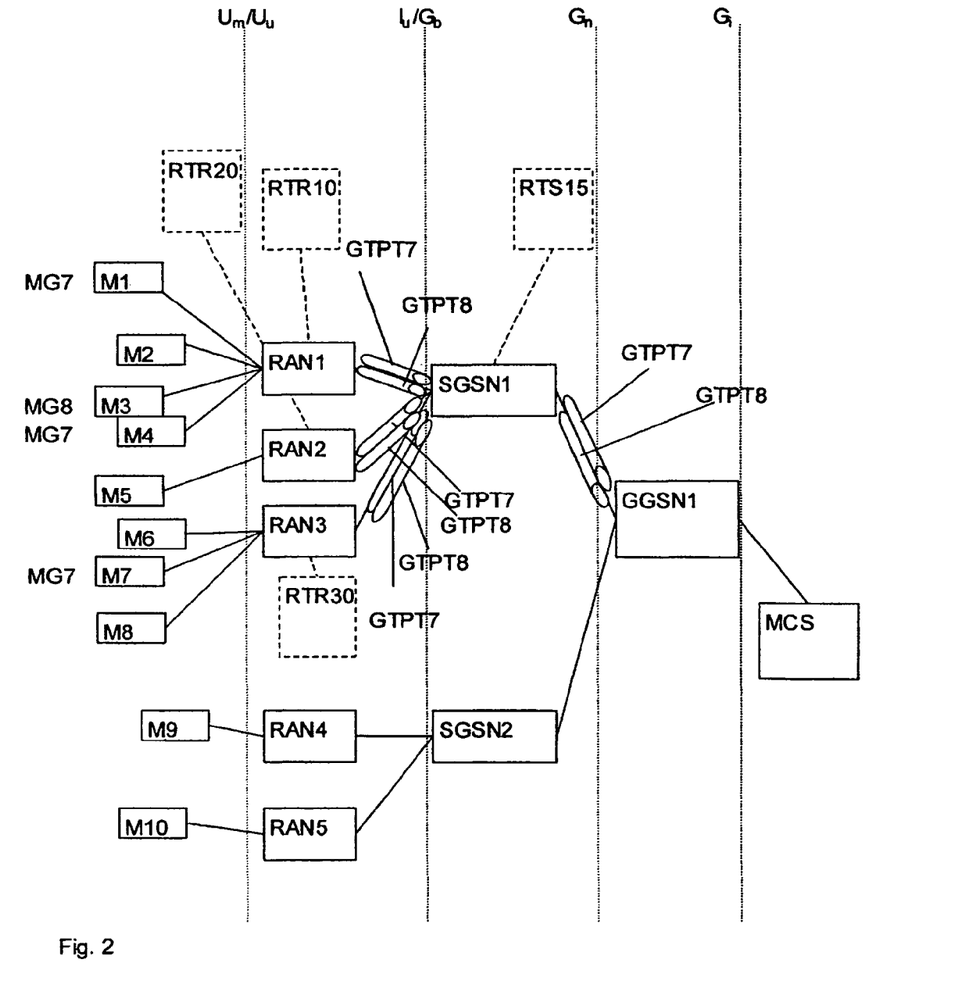
FIG. 2 shows multicast packet flows in an exemplary GPRS communication network according to a second embodiment of the invention.

As an alternative to the above dynamic multicast tree, the GTP tunnels carrying the multicast content can also be pre-configured to be rendered available to a number of predetermined nodes in the GPRS network. The predetermined nodes could correspond to a given regional area. In FIG. 2 such a static multicast tree has been shown whereby multicast content corresponding to multicast groups MG7 and MG8 are distributed via GTP tunnels to RAN1, RAN2 and RAN3. Hence, subscription to these services will only be available to terminals being in the cells corresponding to the above radio access networks.

Such a service would be relevant for geographically oriented content such as local advertisements or traffic information or information regarding a local event happening at a specific venue such as e.g. a sports stadium.

In case static multicast trees are used, the SGSN and/or
   RANs must ignore the multicast data if no clients are registered for the corresponding multicast group.

IP Multicast in Core Network

Instead of using multicast GTP tunnels as described above, IP multicast capabilities of the IP transport network between GGSN and SGSN can be utilised, whereby lower level nodes register to higher level nodes (e.g. a SGSN registering to the GGSN) and datagrams are distributed by IP multicast. In this manner, the connections of the multicast tree are based on memberships to IP multicast addresses.

This is an optional enhancement, which can further optimise the transmission of multicast data. The above option allows for dynamic and pre-configured multicast delivery trees.

Activation of the Service

According to the invention, the multicast application in the mobile station is using IP multicast, and therefore sends an IGMP (Internet Group Management Protocol, RFC 2236) membership report message (MLD, Multicast Listener Report, RFC 2710, in case of Ipv6), when it wants to join a multicast group. This message is received in the GGSN.

If necessary, the GGSN attaches to the multicast delivery tree of the multicast source with the appropriate (multicast routing) protocol. Based on information in the message from the mobile station and information from the multicast source the GGSN can update the quality of service parameters for the context for the mobile station and if necessary update the multicast tree.

The multicast service can be provided by e.g., a content provider, either directly to a number of GGSNs, or via IP Multicast. The user may be notified of the presence of a certain transmission, either by active search for available services in a certain area, e.g. via a web page, or by getting information about the service via e.g. SMS or a push service, e.g. via Session Announcement Protocol (SAP).

The end-user can be notified of the multicast transmissions e.g. via push services or web surfing.

Figure 3:
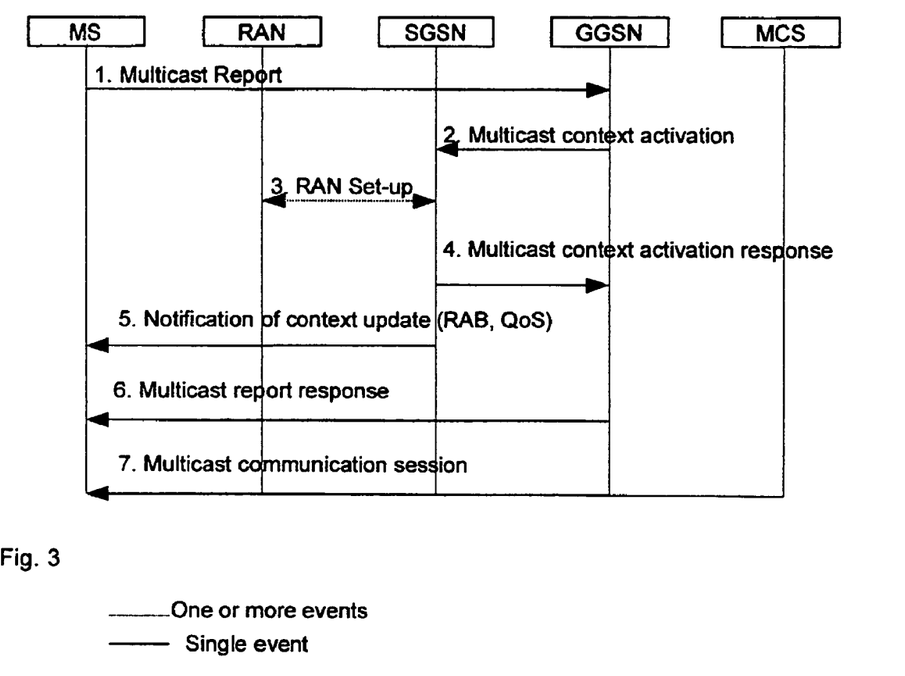
FIG. 3 is a schematic representation of a preferred procedure for activation of a multi-point session according to a preferred embodiment of the invention.

The procedure for establishing the multicast session shall now be further explained with reference to FIG. 3:

Before the procedure can be initiated, the mobile station needs to have established a PDP context for IP.

1. The mobile terminal informs the GGSN of its interest for a specific multicast service.

The mobile terminal issues a membership report message such as IGMP or MLD in case of Ipv6. The message may or may not contain information about the desired quality of service.

2. The GGSN validates the request from the mobile terminal and if necessary registers for the multicast service requested.

The GGSN may decide the quality of service to use for the distribution of the multicast group based on information from the source, operator settings and/or the mobile terminal.

The GGSN sends a multicast context activation message to the SGSN. The message contains the identity of the user, the address of the multicast group and the quality of service that should be used for the given multicast group. Optionally the GGSN uses point-to-point links to the MS if the SGSN is not capable of handling multicast information.

Following the procedure of GGSN-Initiated PDP context modification, the Update PDP context request signalling message could be used for this.

3. The SGSN informs the radio access network that the mobile station is joining this multicast group, so that the proper radio access bearer can be set up for the given multicast session.

This signalling message is dependent on whether there already in this part of the multicast tree is a mobile station listening to or being a member of the given multicast group. If another mobile station already listens to the given multicast group, a link (GTP tunnel or IP multicast connection) of the multicast tree may already be established for this multicast group here.

If no link of the tree is established, the desired link is added to the multicast tree between the SGSN and the RAN.

4. The SGSN updates the context for the mobile station with the multicast group and its quality of service and used APN.

In case the Radio Access Network does not support any multicast radio bearers, this message is not send. The SGSN performs a packet replication and forwards packets using a previously established point-to-point radio access bearer.

The SGSN replies to the GGSN, whereby the SGSN, if not already a part, becomes a part of the multicast tree.

5. The SGSN notifies the mobile station of the radio access bearer and quality of service defined for the multicast session.

The GGSN-Initiated PDP context modification procedure could be used for this purpose. In that case, the Modify PDP context request signal is used.

In case the mobile terminal does not support any multicast radio access bearer, the SGSN carries out the packet replication and forwards packets using the already established point-to-point radio access bearer. In this case, the SGSN does not explicit notify the mobile station.

6. The GGSN may send a reply to the mobile station using a new IGMP response message or MLD message in case of Ipv6.

7. It is now possible for the MS to take part in the multicast communication session.

Mobility

The routing area update procedure is followed when a mobile station moves and enters a new routing area. The context in the SGSN context response from the old SGSN to the new SGSN contains the multicast extensions. However when a mobile station changes SGSN, the setting up and removal of the GTP Multicast tunnel between the GGSN and the SGSNs is dependent on if there is an active context for the given multicast group. If the old SGSN has no other remaining listeners to the given multicast group, it removes the context and its link to the multicast tree. If the new SGSN has no previous context for this multicast group, it needs to attach to the multicast tree.

QoS for the Multicast Service in the GPRS Network

The GGSN may receive information about the QoS parameters for the multicast service from the source directly or indirectly. The information could be received with or without request. Based on this information and possibly also information from the mobile stations about their requested QoS, the GGSN can set up one or several different multicast trees in order to serve different levels of requests and capabilities of the mobile stations. In case the GGSN decides that multiple QoS multicast groups should be used, it informs the individual users about the multicast group that they will belong to by sending a new multicast group address to them. This information can be provided in the IGMP response message or a dedicated message. The GGSN is then responsible for replicating the multicast data on to different QoS multicast groups in the PLMN with different QoS bearers.

Multiple "multicast context activations" must be invoked by the GGSN in case of multiple QoS multicast groups.

General Functionality in the Core Network (CN)

Figure 4:
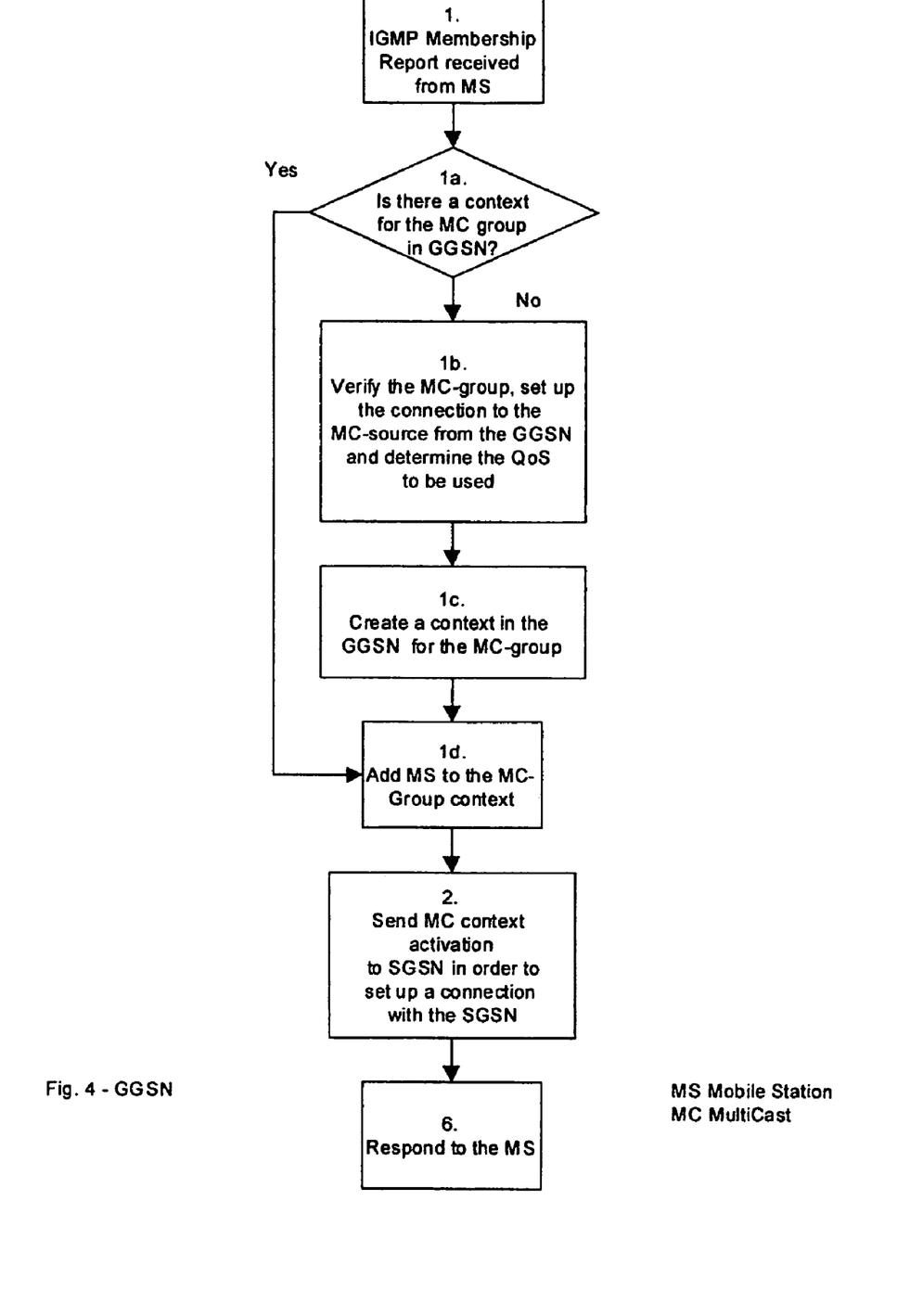
FIG. 4 is a flow diagram for the GGSN according to the invention.
Figure 5:
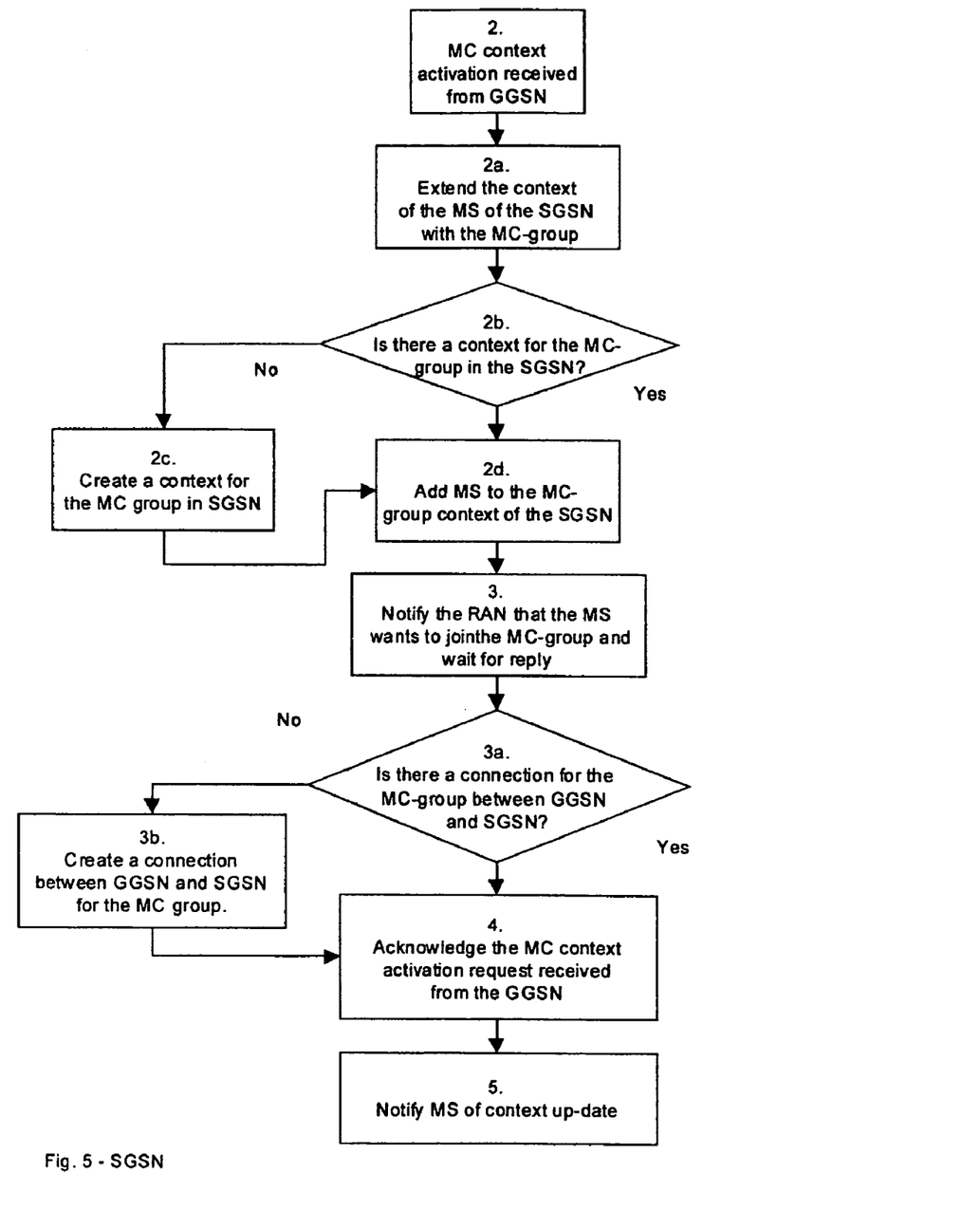
FIG. 5 is a flow diagram for the SGSN according to the invention.

In FIGS. 4 and 5, the functionality of the GGSN and the SGSN has been illustrated further. The steps in FIGS. 4 and 5 refer to the same events as in the handshake diagram of FIG. 3.

Under step 1, the IGMP or MLD Membership report is received from the mobile station, MS.

If there is no multicast context in the GGSN for the multicast group, 1*a*, the GGSN verifies the MC group and sets up a connection, i.e. GTP tunnel if tunnels are used, to the MC source (MCS) and determines the QoS level to be used, 1*b*.

Moreover, a multicast context is created for the MC group, 1*c*.

Subsequently to step 1*a* if the answer was yes or step 1*c*, the mobile station in question is added to the to the MC group context, 1*d*.

According to step 2, the GGSN issues a MC context activation to the SGSN in order to set up the connection from the GGSN to the SGSN in question, e.g. a GTP tunnel for multicast content as shown in FIGS. 1 and 2.

When the SGSN receives the MC context activation message from the GGSN, 2, the SGSN extend its context of the mobile station in question with the respective multicast group, step 2*a*. If a multicast group not already exist on the SGSN, step 2*b*, the SGSN creates a context for the multicast group, step 2*c*.

When the multicast context exist for the MC group in the SGSN the mobile station, MS, is added to the MC group context, step 2*d*.

Subsequently, the RAN is notified that the mobile station wants to join the MC group and wait for reply, step 3.

In case GTP tunnels are used as explained under FIGS. 1 and 2, and if there is a not a GTP tunnel for the MC group between the GGSN and the SGSN, 3*a*, such a tunnel is created, 3*b*.

Subsequently, in step 4, the GGSN acknowledges to the SGSN the MC-context activation request.

In step 5, the SGSN notifies the mobile station of the context up-date. Parameters such as radio bearer RAB and QoS for the session is conveyed to the mobile station.

Finally, in step 6, an IGMP response or comparable MLD message is issued to the mobile station from the GGSN.

The multicast service subscription data may be present in the HLR/HSS (3G). This data may include the following: APN, the unique identifier, encryption and decryption keys, QoS needed (bit-rate), charging info.

Advantageously the RAN nodes should be aware of the context extensions for multicast to such a level that transmissions may be sent, per cell, when at least one active user is present is present in a cell.

Multicast Tunnel Release

When the multipoint PDP-context is deactivated (see e.g. 3GPP TS 23.060), or the host leaves the multicast group (e.g. IGMP leave message), the SGSN checks whether the host was the last member of a MC-group.

If other members exist for the MC-group, the SGSN informs the GGSN that one member has de-registered from the MC-group. Depending on the data stored in the GGSN, the SGSN sends either the host-id or just a message that the counter for the MC-group is to be decreased.

If no more members exist, the SGSN releases the tunnel towards the GGSN. Note that the tunnel may remain for future use if pre-configured multiplexed tunnels are used. Optionally, timers may be used to release tunnels after a certain period of inactivity.

ADVANTAGES OF THE INVENTION

This invention provides an efficient utilisation of scarce and expensive network resources in wireless networks.

Efficient transmission on the Gn and Gp and Iu-PS interface is achieved by transmitting only a single copy of a packet on each link. This reduces the overall transmission resources needed and limits the need for congestion prevention, load balancing algorithms, etc. when multiple clients for the same multicast group are located in the same or different SGSN's. Note that this also applies to scenarios with heterogeneous subscriber equipment or access networks, since layering, e.g. multiple media or multiple adaptation layers as specified in MPEG-4, of the information can be used as described in the background chapter.

Another benefit is the load reduction on the content provider, e.g. streaming server, since the content only needs to be sent once for a whole multicast group.

The multipoint transmission according to the invention is especially advantageous for the air interface of mobile systems, especially in situations where resources are limited, such as when hundreds of users, present in the same mobile communication cell, are receiving the same transmission.

There are many possible applications for mobile multicast sessions according to the invention. Transmission to spectators at a football arena with replays of the latest goal is one example. Traffic information and commercials, e.g. streaming video, within a certain geographical area are examples of other applications, which would be interesting to access wirelessly.

TERMINOLOGY AND ABBREVIATIONS

APN Access Point Name
CN Core Network
GGSN Gateway GPRS Support Node
GPRS General Packet Radio Service
GTP GPRS Tunnelling Protocol
HLR Home Location Register
IGMP Internet Group Management Protocol
L2TP Layer 2Tunnelling Protocol
MC Multicast
MLD Multicast Listener Discovery
MS Mobile Station
PDP Packet Data Protocol
PLMN Public Land Mobile Network
PS Packet Switched
QoS Quality of Service
RAN Radio Access Network
RFC Request For Comments
RTSP Real-time Streaming Protocol
SGSN Serving GPRS Support Node
SIP Session Initiation Protocol
TE Terminal Equipment
TEID Tunnel End Point Id
TID Tunnel Identifier
UC Unicast
UMTS Universal Mobile Telecommunications System
WAP Wireless Application Protocol

The invention claimed is:

1. A Gateway node (GGSN) establishing a multicast service in a packet radio data network including at least one serving node (SGSN) coupled to the gateway node, a plurality of radio access nodes (RAN) coupled to the serving node (SGSN), the packet radio network transporting packet data from an external packet data network to mobile stations (MS) wirelessly attached to radio access nodes (RAN), comprising the steps of:

whereby the gateway node (GGSN), upon receiving a membership report from a mobile station examining if there is a context for the multicast group in the gateway node (GGSN), if no multicast group exists, setting up a connection to the multicast source from the gateway node (GGSN), creating a context in the gateway node (GGSN) for the multicast group;

adding the mobile station to the multicast group; and sending a multicast context activation message to the serving node (SGSN) from which the membership report message appeared in order to set up a connection with the serving node (SGSN).

2. Gateway node according to claim 1, in which subsequently the gateway node (GGSN) upon being informed that a multicast connection has been established between a respective serving node (SGSN) and the mobile station responding to the mobile station that such a connection has been established from the multicast source to the mobile station.

3. The Gateway node according to claim 1, wherein the serving node (SGSN) acknowledging the multicast context activation request from the gateway node (GGSN).

4. The Gateway node according to claim 1 in which the membership report message from the mobile station is an IGMP membership report message.

5. The Gateway node according to claim 1 in which the membership report message from the mobile station is a MLD listener report message.

6. The Gateway node according to claim 1, wherein the connections are formed of GTP tunnels.

7. The Gateway node according to claim 1, wherein the connections are based on memberships to IP multicast addresses.

* * * * *